United States Patent [19]

Middleman et al.

[11] Patent Number: 4,475,138

[45] Date of Patent: * Oct. 2, 1984

[54] CIRCUIT PROTECTION DEVICES COMPRISING PTC ELEMENT

[75] Inventors: Lee M. Middleman, Portola Valley; Frank Doljack, Pleasanton, both of Calif.

[73] Assignee: Raychem Corporation, Menlo Park, Calif.

[*] Notice: The portion of the term of this patent subsequent to Nov. 1, 2000 has been disclaimed.

[21] Appl. No.: 420,346

[22] Filed: Sep. 20, 1982

Related U.S. Application Data

[63] Continuation of Ser. No. 141,987, Apr. 21, 1980, Pat. No. 4,413,301.

[51] Int. Cl.³ .......................................... H02H 3/08
[52] U.S. Cl. ..................................... 361/58; 361/106; 338/22 R
[58] Field of Search ...................... 361/106, 58, 27; 338/22 R, 22 SD, 25; 337/273, 279, 280; 324/62–65; 219/505

[56] References Cited

U.S. PATENT DOCUMENTS

| | | |
|---|---|---|
| 98,711 | 11/1879 | Middleman et al. |
| 141,989 | 4/1880 | Evans. |
| 142,053 | 4/1880 | Middleman et al. |
| 142,054 | 4/1880 | Middleman et al. |
| 2,663,782 | 9/1950 | Insley et al. ............................ 201/63 |
| 3,187,164 | 6/1965 | Andrich ........................... 361/106 X |
| 3,241,026 | 3/1966 | Andrich ........................... 361/106 X |
| 3,243,753 | 3/1966 | Kohler ............................... 219/505 X |
| 3,571,777 | 3/1971 | Tully ................................... 338/25 X |
| 3,586,642 | 10/1971 | Matsuo et al. ...................... 252/520 |
| 3,745,507 | 7/1973 | Ishida et al. ........................... 338/25 |
| 3,760,495 | 12/1973 | Meyer ................................... 29/610 |
| 3,810,062 | 5/1974 | Kozacka ......................... 337/273 X |
| 3,858,144 | 12/1974 | Bedard et al. ..................... 338/22 R |
| 4,177,446 | 12/1979 | Diaz ................................. 338/22 R X |
| 4,237,441 | 12/1980 | Konynenburg et al. ......... 338/22 R |
| 4,238,812 | 12/1980 | Middleman et al. ............... 361/106 |
| 4,246,468 | 1/1981 | Horsma ....................... 338/22 R X |
| 4,255,698 | 3/1981 | Simon ............................. 361/106 X |

FOREIGN PATENT DOCUMENTS

| | | |
|---|---|---|
| 259272 | 3/1926 | United Kingdom . |
| 1005459 | 1/1964 | United Kingdom . |
| 1178661 | 1/1968 | United Kingdom . |
| 1456047 | 12/1973 | United Kingdom . |
| 1456048 | 12/1973 | United Kingdom . |
| 1534715 | 8/1975 | United Kingdom . |
| 1561355 | 8/1976 | United Kingdom . |
| 2036754 | 12/1979 | United Kingdom . |

OTHER PUBLICATIONS

"Current Protectors Take on Surges Without Resetting or Replacement", by George Ballog, Electronics/Jan. 13, 1981, pp. 159-162.

Primary Examiner—Patrick R. Salce
Attorney, Agent, or Firm—T. H. P. Richardson

[57] ABSTRACT

Circuit protection devices which comprise conductive polymer PTC elements and which will provide repeated protection against sudden increases in current to high levels, e.g. 5 amps or more, in circuits which operate at, or are subject to fault conditions arising from, voltages greater than 100 volts, e.g. mains supply voltages. A particularly valuable use of the devices is in the protection of circuitry in telecommunication apparatus which normally operates at battery voltages, e.g. up to 75 volts, but which can be accidentally subject to voltages above 120 volts.

23 Claims, 16 Drawing Figures

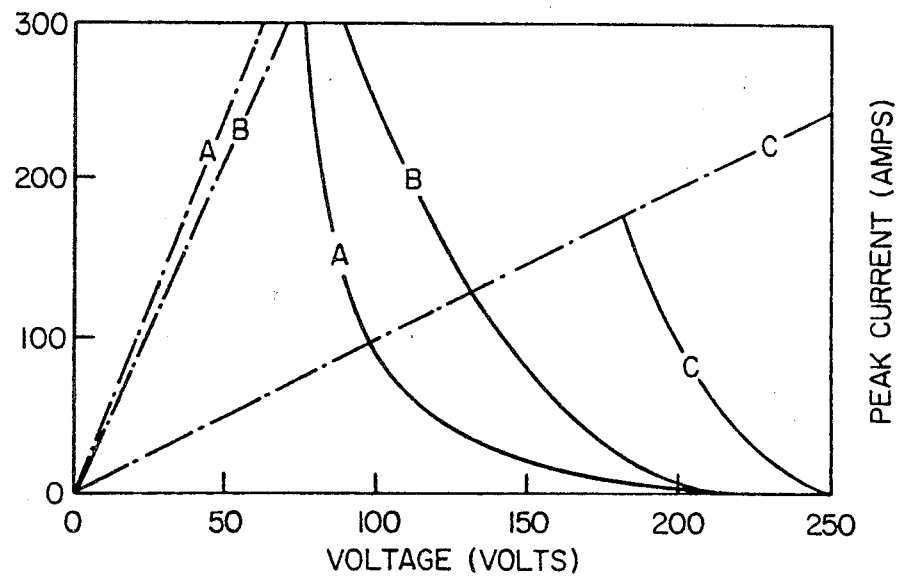
FIG_1
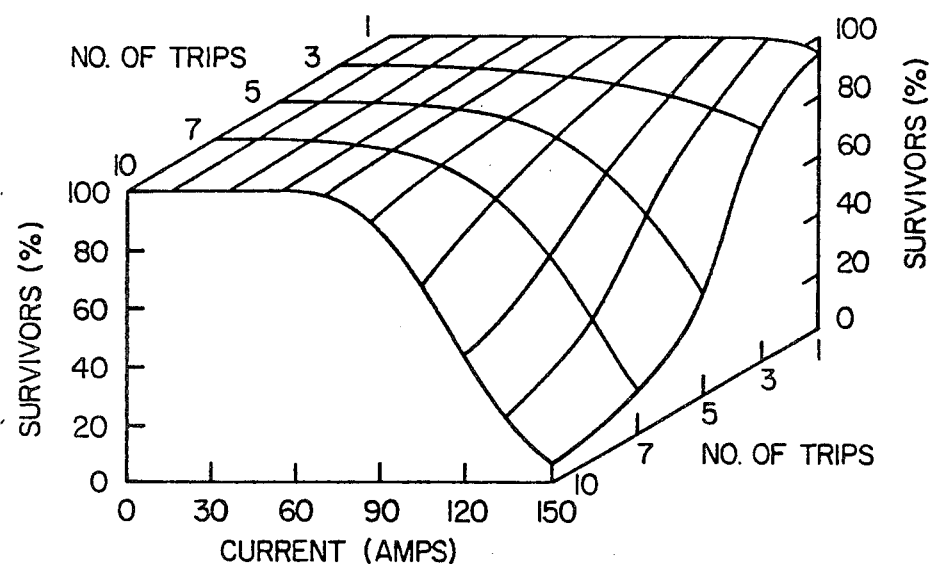
FIG_2

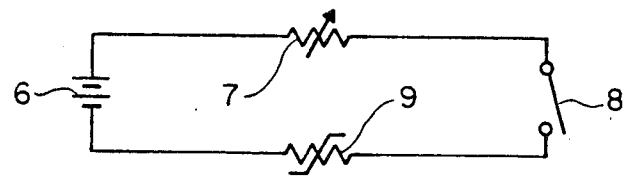
FIG_3
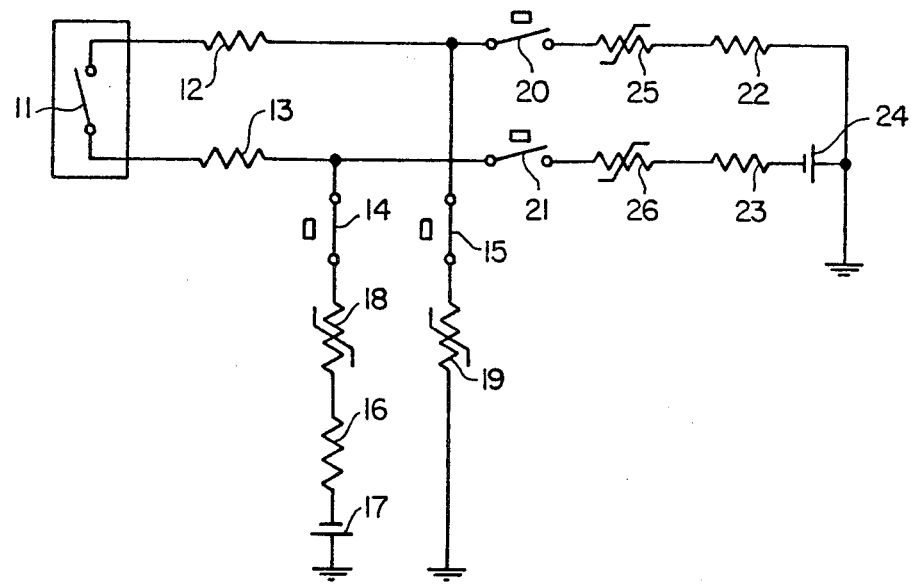
FIG_8
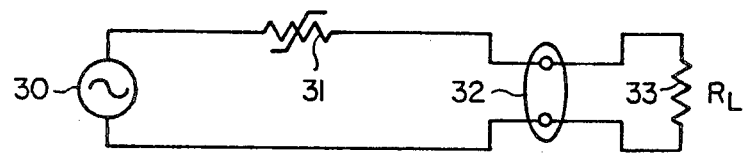
FIG_9

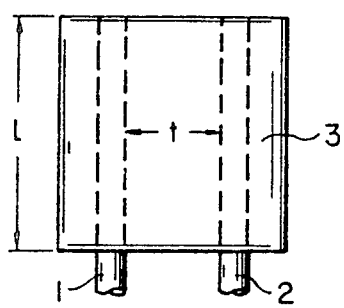 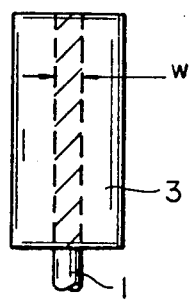 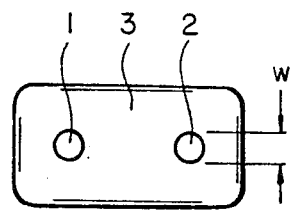
FIG_4A　　　FIG_4B　　　FIG_4C
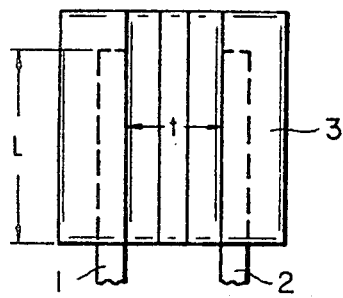 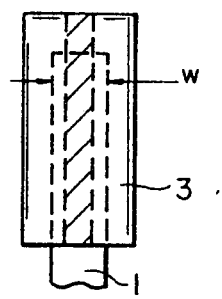 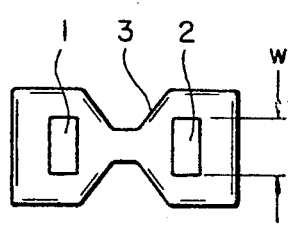
FIG_5A　　　FIG_5B　　　FIG_5C
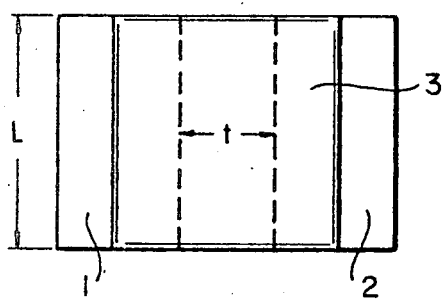 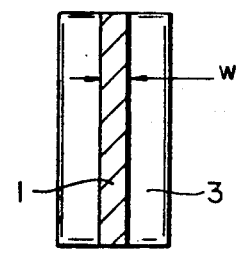 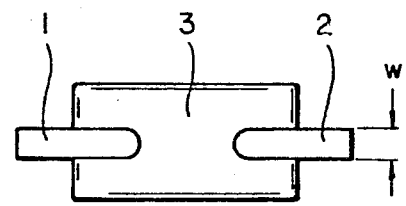
FIG_6A　　　FIG_6B　　　FIG_6C
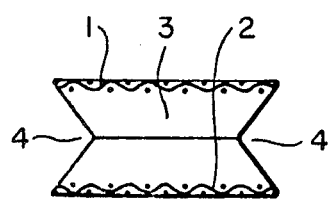 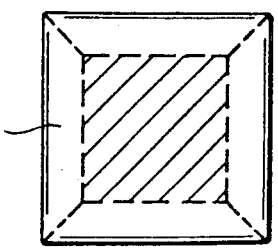
FIG_7A,B　　　FIG_7C

CIRCUIT PROTECTION DEVICES COMPRISING PTC ELEMENT

This is a continuation of application Ser. No. 141,987, filed Apr. 21, 1980, now U.S. Pat. No. 4,413,301.

BACKGROUND OF THE INVENTION

1. Field of the Invention

This invention relates to circuit protection devices which comprise conductive polymer PTC elements.

2. Summary of the Prior Art

Conductive polymer PTC compositions are well known, and for details of recent developments relating to such compositions and devices comprising them, reference may be made for example to U.S. Pat. Nos. 4,017,715 (Whitney et al.), 4,177,376 (Horsma et al.) and U.S. Ser. Nos. 750,149 (Kamath et al.), 732,792 (Van Konynenburg et al.), 751,095 (Toy et al.), 798,154 (Horsma et al.), 873,676 (Horsma), 965,343 (Van Konynenburg et al.), 965,344 (middleman et al), 965,345 (Middleman et al.), 6,773 (Simon), 41,071 (Walker), and 97,711 (Middleman et al). It has been proposed to use devices comprising PTC elements to protect circuits against fault conditions arising from excessive temperatures and/or circuit currents—see for example U.S. Pat. Nos. 2,978,665 (Vernet et al.), 3,243,753 (Kohier) and 3,351,882 (Kohler), U.K. Pat. No. 1,534,715, the article entitled "investigations of Current Interruption by Metal-filled Epoxy Resin" by Littlewood and Briggs in J. Phys D: Appl. Phys. Vol. II. pages 1457–1462, and the article entitled "The PTC Resistor" by R. F. Blaha in Proceedings of the Electronic Components Conference, 1971, and the report entitled "Solid State Bistable Power Switch Study" by H. Shulman and John Bartho (August 1968) under Contract NAS-12-667, published by the National Aeronautics and Space Adminstration. However, it is only very recently, as described in U.S. Ser. Nos. 965,344 (Middleman et al.) and 6,773 (Simon), that circuit protection devices comprising conductive polymer PTC elements have become a practical reality.

The disclosure of each of the patents, patent applications and publications referred to above is incorporated by reference herein.

SUMMARY OF THE INVENTION

In further investigations of the use of previously proposed circuit protection devices comprising PTC conductive polymer elements, we recognized a problem which had not previously been considered, namely that when such a device was used to protect a circuit from a very rapid increase in current (arising, for example, from a short or the intrusion of a new power source), there were many combinations of peak current through the device and peak voltage drop across the device which would substantially impair the ability of the device to function effectively a number of times. By contrast, when the tripping of the device (ie. its conversion to a high resistance high temperature state) took place slowly, eg. as a result of a slow increase in the current or an increase in the temperature of the medium surrounding the device, no such problems were apparent. We found, for example, that previously proposed devices, such as those specifically described in Ser. Nos. 965,344 and 6,773, although capable of providing effective protection on repeated tripping either (a) at peak currents of less than 1 amp, even at voltages as high as 240 volts (and, we believe, also doing so at yet higher voltages), or (b) at voltages of less than 50 volts, even at peak currents of 200 amps (and, we believe, also doing so at yet higher currents), would provide effective protection for at most 4 trips and often fewer, when tripped under conditions of greater electrical stress, e.g. at a voltage of about 200 volts or more and a peak current of 10 amps or more. In some cases the devices ceased to provide effective protection because their resistance had increased to a level where they tripped under the normal operating conditions of the circuit, while in others there was catastrophic failure on tripping, accompanied by explosion or flaming.

The present invention relates to circuit protection devices which have improved performance when subjected to repeated tripping caused by a rapid increase in current.

In one aspect the invention provides a circuit protection device which comprises (1) a PTC element composed of a PTC composition which has a switching temperature $T_s$ and which comprises a polymer component and, dispersed in said polymer component, a particulate filler component which comprises a conductive filler; and (2) at least two electrodes which can be connected to a source of electrical power and which, when so connected, cause current to flow through said PTC element.

said device having a resistance at 23° C. of $_o{}^{23}R_d$ ohms and being such that, when the device is in still air at 23° C. and forms part of a test circuit which is either (a) a first test circuit which consists essentially of the device, a switch, a fixed resistor of resistance $R_1$ ohms and a source of DC electrical power having a voltage of $V_1$ volts, where $V_1$ is 120 volts, preferably 150 volts, and $R_1$ is such that the computed current density in the PTC element in the first of the test cycles defined below reaches a maximum of 1000 amps/inch$^2$, or (b) a second test circuit which consists essentially of the device, a switch, a fixed resistor of resistance $R_2$ ohms and a source of DC electrical power having a voltage $V_2$ volts, where $V_2$ is 240 volts and $R_2$ is such that the peak current through the device in the first of the test cycles defined below is the higher of 1 amp and $3 \times i_{crit}{}^{air}$, where $i_{crit}{}^{air}$ is the maximum steady state current which, when it flows through the device, causes the device to generate heat by $I^2R$ heating at a rate equal to the rate at which heat can be lost from the device, then in at least one of said test circuits, if the test circuit is subjected to N successive test cycles, where N is 5, in each of which test cycles the switch is closed for 30 seconds, the switch is then opened and the device is allowed to cool to 23° C. before the next test cycle is carried out, then in each of said test cycles, the result of closing the switch is that the device generates heat by $I^2R$ heating at a rate which exceeds the rate at which heat can be lost from the device, thus causing the resistance of the device to rise rapidly and the circuit current to fall, and thereafter the device reaches a high temperature stable operating condition in which the rate at which the device generates heat by $I^2R$ heating is equal to the rate at which heat is lost from the device; and after said test cycles have been completed, the device has a resistance at 23° C. which is less than $3 \times _o{}^{23}R_d$ ohms, preferably less than $2 \times _o{}^{23}R_d$. Preferably, the device has performance characteristics as defined above when the number of test cycles, N, is 10 or more.

In another aspect, the invention provides an electrical circuit, referred to herein as an "intrusionprone circuit", which comprises
(1) a source of electrical power having a voltage of V volts;
(2) a circuit protection device comprising at least two electrodes and a PTC element which has a switching temperature $T_s$ and which comprises a polymer component and, dispersed in said polymer component, a particulate filler component which comprises a conductive filler; and
(3) a damageable circuit component which is damaged if the current flowing through it exceeds a value $i_{damage}$ amps for a time t seconds, where t is 30;

said electrical circuit having a normal operating condition in which
(A) a current $i_n$ flows through said device;
(B) said device is at a temperature $T_{dn}$ and has a resistance $R_{dn}$;
(C) said device is in contact with a medium which is at a temperature $T_n$;
(D) a current less than $i_{damage}$ flows through said damageable circuit component; and
(E) there is a stable equilibrium between the rate at which the device generates heat by $I^2R$ heating and the rate at which heat is lost from the device; said device having an electrical power/temperature relationship and being capable of losing heat at a rate such that if new electrical elements comprising a new power source and a switch are introduced into the circuit or a part of the circuit so that a test fault circuit is created in which, when said switch is closed.
(a) there is an initial fault current flowing through said demageable circuit component which exceeds $i_{damage}$;
(b) there is an initial fault current flowing through said devices which results in a computed current density in the PTC element in the first of the test cycles defined below which reaches a maximum of 1000 amps/inch$^2$;
(c) said device and said damageable circuit component are in series; and
(d) the voltage is such that peak potential drop over said device in the first of the test cycles defined below is the higher of 120 volts and $1.5 \times V$;

then if the fault test circuit is subjected to N successive test cycles, where N is 5, in each of which test cycles the switch is closed for 5 seconds, the switch is then opened and the device is allowed to cool to $T_{dn}$ before the next text cycle is carried out, then in each of said test cycles, the result of closing the switch is that the device generates heat by $I^2R$ heating at a rate which exceeds the rate at which heat can be lost from the device, thus causing the resistance of the device to rise rapidly and the circuit current to fall, and thereafter the current through the damageable circuit component reaches a stable value which is less than $i_{damage}$ and the device reaches a high temperature stable operating condition in which the rate at which the device generates heat by $I^2R$ heating is equal to the rate at which heat is lost from the device; and after said test cycles have been completed, the device has a a resistance at $T_{dn}$ which is less than $3 \times R_{dn}$.

In another aspect, the invention provides an electrical circuit, also referred to herein as an "intrusion-prone circuit", which comprises (1) a source of electrical power having a voltage of V volts;
(2) a circuit protection device comprising at least two electrodes and a PTC element which has a switching temperature $T_s$ and which comprises a polymer component and, dispersed in said polymer component, a particulate filler component which comprises a conductive filler; and
(3) a damageable circuit component which is damaged if the current flowing through it exceeds a value $i_{damage}$ amps for a time t seconds, where t is 30;

said electrical circuit having a normal operating condition in which
(A) a current $i_n$ flows through said device;
(B) said device is at a temperature $T_{dn}$ and has a resistance $R_{dn}$;
(C) said device is in contact with a medium which is at a temperature $T_n$;
(D) a current less than $i_{damage}$ flows through said damageable circuit component; and
(E) there is a stable equilibrium between the rate at which the device generates heat by $I^2R$ heating and the rate at which heat is lost from the device;

said device having an electrical power/temperature relationship and being capable of losing heat at a rate such that if new electrical elements comprising a new power source and a switch are introduced into the circuit or a part of the circuit so that a fault test circuit is created in which, when said switch is closed,
(a) there is an initial fault current flowing through said damageable circuit component which exceeds $i_{damage}$;
(b) there is an initial fault current flowing through said device which is the higher of 1 amp and $3 \times i_{crit}$ where $i_{crit}$ is the maximum current which, when it flows through the device in the circuit, causes the device to generate heat by $I^2R$ heating at a rate equal to the rate at which heat can be lost from the device;
(c) said device and said damageable circuit component are in series; and
(d) the voltage is such that the peak potential drop over said device in the first of the test cycles defined below is 240 volts;

then if the fault test circuit is subjected to N successive test cycles, where N is 5, in each of which test cycles the switch is closed for 30 seconds, the switch is then opened and the device is allowed to cool to $T_{dn}$ before the next test cycle is carried out, then in each of said test cycles, the result of closing the switch is that the device generates heat by $I^2R$ heating at a rate which exceeds the rate at which heat can be lost from the device, thus causing the resistance of the device to rise rapidly and the circuit current to fall, and thereafter the current through the damageable circuit component reaches a stable value which is less than $i_{damage}$ and the device reaches a high temperature stable operating condition in which the rate at which the device generates heat by $I^2R$ heating is equal to the rate at which heat is lost from the device; and after said test cycles have been completed, the device has a resistance at $T_{dn}$ which is less than $3 \times R_{dn}$.

In another aspect, the invention provides an electrical circuit, referred to herein as a "fixed voltage circuit", which comprises
(1) a circuit protection device comprising at least two electrodes and a PTC element composed of a PTC composition which has a switching temperature $T_s$ and which comprises a polymer component and, dispersed in said polymer component, a particulate filler component which comprises a conductive filler;

(2) a source of electrical power having a voltage of $V_1$ volts which is at least 120 volts; and (3) other circuit elements which are connected in series with said PTC element and which have an impedance $R_L$ ohms;

said electrical circuit having a normal operating condition in which (A) a current $i_n$ flows through said device;

(B) said device is at a temperature $T_{dn}$ and has a resistance $R_{dn}$ which is less than $0.5 \times R_L$ ohm and less than $V_1$ ohms;

(C) said device is in contact with a medium which is at a temperature $T_n$; and (D) there is a stable equilibrium between the rate at which the device generates heat by $I^2R$ heating and the rate at which heat is lost from the device;

and said device having an electrical power/temperature relationship and being capable of losing heat to said medium at a rate such that (a) if elements of the circuit are changed so that the current flowing through said device increases slowly from $i_n$ while maintaining $T_n$ substantially constant, then the temperature of the device increase slowly until the circuit reaches a critical operating condition in which (i) the equilibrium between the rate at which the device generates heat by $I^2R$ heating and the rate at which heat is lost from the device is unstable, (ii) the device is at a temperature $T_{d\,trip}$ and has a resistance $R_{d\,trip}$, (iii) the rate at which the resistance of the device changes with temperature, $dR_{d\,trip}/dT_{d\,trip}$, is positive, and (iv) the current has a a value $i_{crit}$; and (b) if elements of the circuit are further changed so that the current flowing through the device increases to $2 \times i_{crit}$, while maintaining $T_n$ substantially constant, then the rate at which the device generates heat by $I^2R$ heating exceeds the rate at which heat can be lost from the device and thus causes the temperature and the resistance of the device to rise rapidly and the circuit current to fall, and thereafter the circuit reaches a high temperature stable operating condition in which (i) the rate at which the device generates heat by $I^2R$ heating is equal to the rate at which heat is lost from the device; and (ii) the device is at a temperature $T_{d\,latch}$ which is such that the ratio of the power in the circuit in the normal operating condition to the power in the circuit in the high temperature stable operating condition, the Switching Ratio, is at least 8;

and said device, after having been subjected to the test routine defined below, (i) having a resistance at $T_{dn}$ which is less than $3 \times R_{dn}$, less than $0.5 \times R_L$, and less than $V_1$ ohms; and (ii) having an electrical power/temperature relationship such that, when the device is replaced in said electrical circuit after having been subjected to said test routine, the electrical circuit (a) has a normal operating condition as defined, and (b) when the elements of the circuit are changed so as to increase the current in the circuit, the circuit first reaches a critical operating condition as defined and then reaches a high temperature stable operating condition as defined;

said test routine consisting of placing the device in a test circuit which consists essentially of the device,, a switch, a fixed resistor of resistance of $R_1$ ohms and a source of electrical power having a voltage of $V_1$ volts, the device being in contact with said medium at said temperature $T_n$ and $R_1$ being such that the computed current density in the PTC element reaches a maximum of 1000 amps/inch$^2$, and subjecting the test circuit to N successive test cycles, where n is 5; in each of which test cycles the switch is closed for 5 seconds, whereby the device initially generates heat by $I^2R$ heating at a rate which exceeds the rate at which heat can be lost from the device, thus causing the resistance of the device to rise rapidly and the circuit current to fall, and thereafter the device reaches a high temperature stable operating condition in which the rate at which the device generates heat is equal to the rate at which heat is lost from the device; the switch is opened; and the device is allowed to cool to $T_n$ before the next test cycle is carried out.

In another aspect, the invention provides an electrical circuit, also referred to herein as a "fixed voltage circuit", which comprises (1) a circuit protection device comprising at least two electrodes and a PTC element composed of a PTC composition which has a switching temperature $T_s$ and which comprises a polymer component and, dispersed in said polymer component, a particulate filler component which comprises a conductive filler;

(2) a source of electrical power having a voltage $V_2$ volts which is at least 240 volts; and (3) other circuit elements which are connected in series with said PTC element and which have an impedance $R_L$ ohms;

said electrical circuit having a normal operating condition in which (A) a current $i_n$ flows through said PTC element;

(B) said device is at a temperature $T_{dn}$ and has a resistance $R_{dn}$ which is less than $0.5 \times R_L$ ohm and less than $V_2$ ohms;

(C) said device is in contact with a medium which is at a temperature $T_n$; and (D) there is a stable equilibrium between the rate at which the device generates heat by $I^2R$ heating and the rate at which heat is lost from the device;

and said device having an electrical power/temperature relationship and being capable of losing heat to said medium at a rate such that (a) if elements of the circuit are changed so that the current flowing through said device increases slowly from $i_n$ while maintaining $T_n$ substantially constant, then the temperature of the device increases slowly until the circuit reaches a critical operating condition in which (i) the equilibrium between the rate at which the device generates heat by $I^2R$ heating and the rate at which heat is lost from the device is unstable, (ii) the device is at a temperature $T_{d\,trip}$ and has a resistance $R_{d\,trip}$, (iii) the rate at which the resistance of the device changes with temperature, $dR_{d\,trip}/dT_{d\,trip}$, is positive, and (iv) the current has a a value $i_{crit}$; and (b) if elements of the circuit are further changed so that the current flowing through the device increases to $2 \times i_{crit}$, while maintaining $T_n$ substantially constant, then the rate at which the device generates heat by $I^2R$ heating exceeds the rate at which heat can be lost from the device and thus causes the temperature and the resistance of the device to rise rapidly and the circuit current to fall, and thereafter the circuit reaches a high temperature stable operating condition in which (i) the rate at which the device generates heat by $I^2R$ heating is equal to the rate at which heat is lost from the device; and (ii) the device is at a temperature $T_{d\ latch}$ which is such that the ratio of the power in the circuit in the normal operating condition to the power in the circuit in the high temperature stable operating condition, the Switching Ratio, is at least 8;

and said device, after having been subjected to the test routine defined below, (i) having a resistance at $T_{dn}$ which is less than $3 \times R_{dn}$, less than $0.5 \times R_L$, and less than $V_2$ ohms; and (ii) having an electrical power/temperature relationship such that, when the device is replaced in said electrical circuit after having been subjected to said test routine, the electrical circuit (a) has a normal operating condition as defined, and (b) when the elements of the circuit are changed so as to increase the current in the circuit, the circuit first reaches a critical operating condition as defined and then reaches a high temperature stable operating condition as defined;

said test routine consisting of placing the device in a test circuit which consists essentially of the device, a switch, a fixed resistor of resistance $R_2$ ohms and a source of electrical power having a voltage of $V_2$ volts, the device being in contact with said medium at said temperature $T_n$, and $R_2$ having such that in the first of the test cycles defined below the peak current through the device is the higher of 1 amp and $3 \times i_{crit}$, and subjecting the test circuit to N successive test cycles, where N is 5; in each of which test cycles the switch is closed for 30 seconds, whereby the device initially generates heat by $I^2R$ heating at a rate which exceeds the rate at which heat can be lost from the device, thus causing the resistance of the device to rise rapidly and the critical current to fall, and thereafter the device reaches a high temperature stable operation condition in which the rate at which the device generates heat is equal to the rate at which heat is lost from the device; the switch is opened; and the device is allowed to cool to $T_n$ before the next test cycle is carried out.

It will of course be understood that when the device is replaced in one of the fixed voltage circuits defined above after the test routine, the new values of $i_n$, $T_{dn}$, $R_{dn}$ and $i_{crit}$ will not in general be the same as they were previously, because the resistance of the device has been changed (within the defined limits) by the test routine.

BRIEF DESCRIPTION OF THE DRAWINGS

The invention is illustrated in the accompanying drawings, in which

FIG. 1 shows, in a generalized fashion, the combinations of peak current and peak voltage which will impair the ability of previously proposed devices and of devices of the present invention to function effectively a number of times;

FIG. 2 shows, in a somewhat more detailed, but still generalized fashion, how variation of the peak current through the device at a particular voltage above 75 volts will affect the ability of a device to function effectively a number of times;

FIG. 3 shows the test circuit which is used in determining the ability of a device to function effectively a number of times;

FIGS. 4A to 7C show devices of the invention; and

FIGS. 8 and 9 show circuits including devices of the invention.

DETAILED DESCRIPTION OF THE INVENTION

The circuit protection devices of the present invention are defined by reference to their behavior when they are surrounded by still air at 23° C. and form part of one of the two defined test circuits. It should be noted that the devices of the invention need have the defined performance in only one of the two test circuits. Preferred devices have the defined performance in both test circuits.

In order to define devices of similar utility when used under different conditions, the same test routines can be carried out with the device in still air at different temperatures, eg. 0° C. or 70° C.

The circuit protection devices of the invention are useful for protecting a wide variety of circuits against fault conditions which cause a current through the circuit (or a part of the circuit) which, if sustained for too long, will cause damage to one or more components of the circuit. However, the selection of a protection device for a particular circuit requires a knowledge of the normal operating condition of the circuit (under which the device must remain in a low temperature low resistance state), the thermal environment of the device (which affects the electrical conditions which will cause it to trip), and the expected fault condition (or conditions, since it may be desirable for the device to trip under more than one fault condition). Furthermore, it is often important to know how long it will take for the device to trip under a given fault condition, i.e. the time within which the fault current will be reduced to a safe level; in this connection it should be noted (a) that many electrical components can safely pass, for a limited time which may be as much as several seconds, a current which, if sustained, will cause damage, and (b) that it may be desirable that the protection device should pass, without tripping, a very high transient current such as that generated by a lightning strike. Accordingly, in defining the circuits of the present invention, these factors have been taken into account by defining the devices used in those circuits by their performance in test routines which reflect expected fault conditions in the particular circuit. For example, in the test routine, the device is in contact with the same medium at the same temperature $T_n$ as it is in the normal operating condition of the circuit. The medium can (and often will be) still air, but other media can be employed, and different parts of the device may be in contact with different media. The temperature of the medium, $T_n$, will normally be 0° C. or above and is typically room temperature such as 23° C., though higher temperatures may be used, e.g. 70° C. or more.

The present invention is particularly concerned with devices providing effective protection against fault conditions in which there is a rapid increase in current to at least 1 amp accompanied by a voltage of at least 150 volts and in which the previously proposed devices will not provide repeated protection; thus previously proposed devices do not have the required performance in the various test routines above. However it is to be understood that the present devices will also provide protection against other fault conditions which will cause the device to trip (e.g. an excessive increase in the temperature of the medium surrounding the device or a slow increase, to an excessive level, in the current), in which previously proposed devices will also function effectively.

Except where otherwise specified, the currents, current densities and voltages referred to herein may be (or result in) direct current (DC) or alternating current (AC), the latter term being used to include the case where the circuit or test circuit includes both an AC power supply and a DC power supply. AC values given herein are RMS values. Similarly, the term "resistance" is used herein to include impedance, and the circuits of the invention may include loads which are resistive, capacitative or inductive or any combination thereof. The term "fixed resistor" is used to mean a resistor whose resistance remains substantially constant throughout the test routine.

We have found that in the test routines referred to above, a given device is more likely to meet the test requirements if a DC source is used than it is if an AC source of the same RMS voltage is used. The devices preferably not only meet the test requirements when a DC source is used but also when an AC source is used. In the defined test routines, the number of test cycles, N, is 5. Preferably the devices have the required performance characteristics when N is 10 or more.

A fault condition in which there is a rapid increase in current to at least 1 amp accompanied by a voltage of at least 120 volts can arise in a circuit containing a power source which has a voltage of at least 120 volts and remains the sole power source in the fault condition. Such a fault condition can also arise in a circuit in which the normal power source is above or below 120 volts but which in the fault condition is subject to the intrusion of another power source which has a voltage of at least 120 volts and at least 1.5 times the normal voltage or, if the normal power source is a part of the fault circuit, has in combination with the normal power source a voltage of at least 120 volts and at least 1.5 times the normal voltage. The normal power source of the circuit may be DC or AC. Where the fault condition arises from the intrusion of a new power source, the new power source may be AC or DC and may be a directly connected power source or an induced power source. We have found the invention to be particularly useful in circuits which normally operate at DC voltages of less than 75 volts, e.g. around 50 volts, such as may be provided by batteries, and which are subject to fault conditions arising from the intrusion of AC power sources having a voltage of at least 200 volts, e.g. a mains supply voltage such as 220, 330 or 660 volts.

Where the normal power source of the circuit remains the sole power source in the fault condition (such circuits are referred to herein as "fixed voltage circuits"), the characteristics of the device can best be defined by reference to (a) its ability to provide repeated tripping in the defined test circuit (in which the device is subjected to an electrical stress similar to the maximum electrical stress which is likely to arise when the device is used to protect the circuit) and also by reference to (b) its behavior when the current in the circuit is slowly increased to $i_{crit}$ and thereafter the current is increased to $2 \times i_{crit}$ (very rapidly, of course, since the rapid increase in the resistance of the device will otherwise prevent the circuit current from reaching $2 \times i_{crit}$). It will of course be realized that the behavior of the device under the conditions of (b) above is not the same as its behavior when it is subject to a very rapid increase in current which causes it to trip. However, a more comprehensive definition of the device can be achieved by reference to its behavior under the conditions of (b) above, since the slow increase of the current up to $i_{crit}$ means that up to that stage the device is in a uniform thermal condition, whereas if the current is increased very rapidly from $i_n$, the thermal mass of the device will cause the temperature of at least part of the device, at any particular current, to be different from that achieved under thermal equilibrium conditions at that current.

In the fixed-voltage circuits of the present invention, the voltage, V, of the power source is at least 120 volts, e.g. 200 to 250 volts, and will usually be an AC source. The resistance of the device under normal operating conditions, $R_{dn}$, is less than $0.5 \times R_L$ ohm, where $R_L$ is the impedance of the remainder of the circuit which is in series with the device; $R_{dn}$ is preferably less than $0.1 \times R_L$ ohm, particularly less than $0.04 \times R_L$. $R_L$ is preferably substantially constant, i.e. does not vary by more than $\pm 25\%$, in the temperature range of operation of the circuit. $R_{dn}$ should preferably be low enough to ensure that the device does not consume excessive amounts of power under normal operating conditions of the circuit, but not so low that the peak current through the device in the test circuit (which appropimates the worst case fault) is so high that the device will not provide repeated and effective protection; bearing these facts in mind, $R_{dn}$ is preferably from $0.03 \times V$ to $0.3 V$, particularly from $0.05 \times V$ to $0.2 \times V$, ohms.

The Switching Ratio in the fixed-voltage circuits of the invention (i.e. the ratio of the power in the circuit in the normal operating condition to the power in the circuit in the tripped condition) is at least 8, generally at least 10, and in most cases is preferably substantially higher for example at least 20, preferably at least 40, in order to ensure that the current in the circuit is reduced to a level which will not damage any part of the circuit. When it is in the tripped condition, the device may be "latched" (i.e. it will remain in a high resistance, high temperature state even if the fault condition is removed) or not.

In discussing the fixed voltage circuits of the present invention, reference has not yet been made to the speed with which the device will be converted to the tripped condition when subjected to a given fault condition. The time taken to trip the device, which is referred to herein as the "trip time", is dependent on the fault condition and may vary widely, e.g. from as little as a fraction of a second at currents which are many times greater than $i_{crit}$ to as much as 30 minutes at currents which are only just over $i_{crit}$. The devices used in the fixed voltage circuits of the present invention preferably have a trip time of less than 5 seconds, especially less than 1 second, in each of the test cycles as defined above.

The present invention also includes circuits which include a circuit protection device whose function is to protect the circuit from the intrusion of a new power source. Such circuits are referred to herein as "intrusion-prone circuits". A highly important example of such a circuit is in telecommunication apparatus which normally operates on DC current at battery voltages of, for example, 40 to 75 volts, but which can be accidentally subject to mains voltages, e.g. when a mains supply cable falls across a telephone line. Use f the present invention to provide such protection is described in detail later in the specification.

It should be noted that in the intrusion-prone circuits, the normal power supply can, but need not, form part of the fault circuit. Thus the fault condition can arise from intrusion of a new power source which also creates the fault circuit, even if the normal circuit, by reason of an open switch, is not in operation at the time. The protection device must be in a low resistance low temperature state when the normal circuit is in its normal operating condition, but must be selected so that it will be tripped by the anticipated intrusion of a new voltage source. The device may also be tripped by the occurrence of a fault condition which does not involve the intrusion of a new voltage source, as discussed above in connection with fixed voltage circuits.

The devices used in the intrusion-prone circuits of the present invention are defined by reference to their behavior in the normal operating condition of the circuit, and their behavior in the defined fault test circuit. The devices used in the intrusion-prone circuits preferably have a trip time of less than 5 seconds, especially less than 1 second in each of the test cycles as defined. Preferred intrusion-prone circuits are those in which the supply voltage V is 75 volts or less DC and the fault voltage, $V_{int}$, is an AC voltage of 240 volts, 330 volts or 660 volts.

Although the device is selected so that it will protect the circuit from the intrusion of a new voltage source, it will of course also protect the circuit from fault which increase the current through the device to a sufficiently high level without such intrusion, as discussed above in connection with the fixed voltage circuits of the invention. Accordingly the device preferably also has the various features and preferred characteristics set out above for the devices in the fixed voltage circuits of the invention.

One of the advantages of the devices used in the present invention is that although they will trip when subjected to an appropriate fault condition which is maintained for a sufficient time to cause tripping, they will neither be tripped nor damaged by a transient fault condition such as that which occurs when the circuit is subject to a lightning strike, which may result for example in a current of the order of 40 amps for a time of 100 microseconds.

As noted above, the previously proposed circuit protection devices often fail to provide repeated protection against sudden increases in current to a level of at least 1 amp and at a voltage of at least 120 volts, and in particular fail to meet the newly recognized test requirements for the devices and circuits of the invention. While the reasons for this failure are not entirely clear, our investigations indicate that in many, if not all, circumstances, it is associated with arc formation within the conductive polymer element adjacent the electrodes. We have found that the devices of the present invention preferably have one or more of the following features which contribute to the ability of the device to provide repeated effective protection against fault conditions which cause failure of previously proposed devices.

(1) The use of a conductive polymer composition containing an additive such as alumina trihydrate which reduces the susceptibility of the PTC composition to form carbonaceous conductive paths as a result of arcing, by reducing the tendency of the composition to arc and/or by ensuring that the decomposition products of arcing are non-conductive. Such compositions are described in detail in the commonly assigned application of Evans, entitled "Conductive Polymer Compositions Having Improved Properties Under Electrical Stress" filed contemporaneously with this application, the disclosure of which is incorporated by reference herein, and will not therefore be further described in detail in this specification.

(2) The use of device designs which, even if after partial erosion of a PTC element composed of a composition as described in (1) as a result of arcing, still comprise current paths for subsequent tripping which are substantially equivalent electrically.

(3) The use of device designs which reduce the electrical stress adjacent the electrodes, particularly designs which result in the parts of the PTC element which are most rapidly heated during tripping (the so-called "hot line" or "hot plane") being separated from the electrodes, preferably by a distance greater than that which can be bridged by an arc at the voltage and current applied (see Application Ser. No. 41,071 (Walker) and the two commonly assigned applications entitled Circuit Protection Devices, now U.S. Pat. Nos. 4,352,083 and 4,317,027, filed contemporaneously herewith, the disclosures of which are incorporated by reference herein).

(4) The use of oxygen barriers around the electrodes and PTC element which are composed of, or are separated from the PTC element by, a material which does not entrap any decomposition products of the PTC material resulting from arcing and which is not itself decomposed or damaged by arcing of the PTC element, e.g. a sealed enclosure which is composed at least in part of a metal and which surrounds the PTC element but is separated therefrom by an inert gas or a vacuum (see Ser. No. 98,711 of Middleman et al., the disclosure of which is incorporated by reference herein). The interior surface of the oxygen barrier is preferably of insulating material.

(5) The use of PTC compositions which are substantially free from cross-linking.

As indicated in (2) and (3) above, the shapes of the electrodes and PTC element play an important role in the performance of the device. Before discussing these and other factors in detail, various terms used in this specification will be defined.

The term "electrically active surface" of an electrode is used herein to denote the surface of the electrode through which current flows when current is passed through the device.

The term "effective surface area" or "ESA" of an electrode is used herein to denote the cross-sectional area of the electrode when viewed in the direction of current flow (ignoring any apertures in the electrode which are sufficiently small for the electrode to provide a substantially equipotential surface over its total area).

As those skilled in the art will recognize, when the electrode does not have a planar surface at right angles to the direction of current flow (e.g. when wire electrodes are used, as described below), the current density will vary across the electrode and PTC element in a complex fashion. Therefore, in the interests of simplicity, the term "computed current density" has been used herein, and means the largest of (i) the current divided by the ESA of the first electrode, (ii) the current divided by the ESA of the second electrode and (iii) the current divided by the minimum cross-sectional area of the PTC element at right angles to the direction of current flow. The values of (i) and (ii) will usually be the same, and the value of (iii) can be smaller, the same, or larger, In some of the test procedures defined above, reference is made to the fact that the "computed current density in the PTC element ... reaches a maximum of 1000 amps/inch$^2$". By this is meant that when the peak current is flowing through the device, the computed current density is 1000 amps/inch$^2$.

The term "inter-electrode distance", t is used herein to denote the shortest geometric distance between two electrodes.

The width of an electrode, w, is defined herein as the smallest dimension of the ESA. The length of an electrode, l, is defined herein as the largest dimension of the ESA. The equivalent diameter of an electrode is defined herein as the diameter of a circle having the same area as the ESA of the electrode.

The minimum cross-sectional area of the PTC element, $A_{min}$, is the area of the smallest cross-section of the PTC element between the electrodes at right angles to the direction of current flow.

The electrodes in the devices used in the present invention may have one or more of the following characteristics.

(a) They are composed of a material having a resistivity of less than $10^{-4}$ ohm.cm and have a thickness such that they do not generate significant amount of heat during operation of the device. The electrodes are typically composed of a metal, nickel or nickel-plated electrodes being preferred.

(b) They are in the form of wires or thin strips, preferably of the same dimensions and parallel to the other, and preferably completely embedded in the PTC element. Such electrodes may for example have an ESA of 0.01 to 0.1 inch$^2$, l from 0.3 to 1 inch and w from 0.02 to 0.1 inch.

(c) They are in the form of planar sheets, generally rectangular or circular, and preferably of the same area and placed parallel and opposite to each other on either side of a flat PTC element. Such electrodes may, for example, have an ESA of 0.3 to 0.8 inch$^2$, and l and w from 0.5 to 1 inch. Electrodes of this type are described in application Ser. No. 965,344.

(d) They are in physical (as well as electrical) contact with the PTC element, or separated therefrom by a layer of another conductive material, e.g. a layer of a relatively constant wattage conductive polymer composition.

The PTC element in the devices used in the present invention is composed of a conductive polymer composition, preferably one in which the conductive filler comprises carbon black or graphite or both, especially one in which carbon black is the sole conductive filler, especially a carbon black having a particle size, D, which is from 20 to 50 millimicrons and a surface area, S, in M$^2$/g such that S/D is not more than 10. The resistivity of the composition at 23° C. will generally be less than 100 ohm.cm, especially less than 10 ohm.cm. The composition is preferably substantially free from cross-linking, especially when it contains an arc-controlling additive, since we have found that the presence of cross-linking tends to increase the likelihood of formation of carbonaceous conductive paths when arcing takes place. The PTC element will generally be of uniform composition throughout, but may comprise segments of different composition, e.g. adjacent the electrodes.

The devices used in the present invention will usually have a resistance of less than 100 ohms, preferably less than 50 ohms, and may for example have a resistance of 0.1 to 25 ohms. Often the size of the device, including any oxygen barrier around the PTC element and the electrodes, will be an important consideration, and the device design and the resistivity of the PTC composition should be selected with this in mind (as well as, of course, the resistance and other desired electrical characteristics). Preferred devices have a volume of less than 2 inch$^3$, particularly less than 1 inch$^3$, especially less than 0.5 inch$^3$; the largest dimension of the device is preferably less than 3 inch, particularly less than 2 inch, especially less than 1 inch.

In one preferred class of devices, each of the electrodes is at least partially embedded in the PTC element so that the electrically active surface thereof has a generally columnar shape. Devices of this kind are shown in FIGS. 4A, 4B and 4C, 5A, 5B and 5C and 6A, 6B and 6C, which are front, side and plan views of three devices. In each Figure electrodes 1 and 2 are at least partially embedded in PTC element 3, the interelectrode distance between t, the embedded length of the electrode being 1 and the width of the electrode being w (and the ESA therefore being 1×w). In each of FIGS. 4B, 5B and 6B, the area used in calculating the computed current density is shaded, i.e. the ESA of each electrode in FIGS. 4B and 6B, and the minimum cross-sectional of the PTC element in FIG. 5B. In devices of this class, t is preferably constant; and w is preferably less than t, particularly less than 0.75 t, especially less than 0.5 t.

The smaller W is in relation to t, and the smaller the minimum width (and minimum cros-sectional area) of the PTC element between the electrodes, the greater the likelihood that the hot plane will form away from the electrodes, as is desirable. On the other hand, the smaller the minimum width of the PTC element, the smaller the amount of erosion which is required before the electrical characteristics of the device are changed. Thus the relationship between the minimum width of the PTC element and the width of the electrodes should be selected having regard to the expected fault conditions and the number of trips required of the device before failure.

In devices of the preferred class, the PTC element preferably has a width, at all points between the electrodes, which is at least 0.2×W. eg 0.3×W to 2×W, and, depending on the desired characteristics of the device, may be from 0.4×W to 0.8×W or from 0.8×W to 1.5×W.

We have found, for example, that repeated tripping of a device as described in detail in the Example below, which is a device of the kind shown in FIG. 4, causes the PTC element to become progressively eroded along a plane midway between the electrodes at right angles to the direction of current flow, and that the device often continues to provide effective protection until it has been divided in half by the erosion. It is preferred that the electrodes should be such that if a device fails in this way, the electrodes should be spring-biased or the device otherwise arranged so that the two parts of the PTC element fall away from each other, so that the device fails in the open position.

Devices of this preferred class may have for example a resistance of 23° C. of 1 to 100 ohms, preferably 10 to 30 ohms, and an $i_{crit}$ of 0.05 to 2 amps, preferably 0.08 to 0.5 amps.

In another class of devices, the electrodes are in the form of planar sheets with a flat PTC element between them. Such devices tend to be more prone to failure through arcing than devices of the preferred class, but can be of lower resistance, e.g. 0.05 to 1 ohm, preferably 0.08 to 0.3 ohm. In such devices, it is highly desirable that the minimum cross-sectional area of the PTC element should be less than the ESA of the electrodes and separated therefrom by at least 0.05 inch, and that the PTC element be composed of a composition containing an arc-controlling additive. A device of this type is illustrated in FIGS. 7A,B and 7C. FIGS. 7A,B shows the front and side views of the device (which are identical) and FIG. 7C shows a plan view of the device. Planar metal mesh electrodes 1 and 2 contact either side of PTC element 3, which has channels 4 cut into each edge thereof. The shaded area of FIG. 7C shows the area over which the computed current density is calculated.

Referring now to FIG. 1, this shows, for three devices A, B and C, on the broken lines the size of the peak current (or inrush current) for different voltages across each device, the slope of the line being set by the resistance of the device in accordance with Ohm's law. The solid lines are a measure of the ability of each device to provide repeated and effective protection at a particular voltage and current. If the voltage and current fall beneath the solid line, then the device will have the required performance; if they fall above the solid line, the device will not have the required performance. Device A is one of the previously proposed devices, Devices B and C are devices of the present invention, Device B being for example a laminar device of the type shown in FIG. 7 and Device C being for example a device of the type shown in FIG. 4.

The positions of the solid lines in FIG. 1 are of course dependent on the particular standard of performance which is required for a device to be regarded as satisfactory, e.g. the ability to trip 5 or 10 times. In addition it should be realized that in a number of devices manufactured in an identical way, there will often in fact be some differences between the devices and that the positions of the solid lines therefore also depend on a decision as to the percentage of devices which must have the particular standard of performance. A better understanding of the latter factor can be gained from FIG. 2, which shows a typical result of testing a batch of identically manufactured devices at a particular voltage, but at different peak currents, a number of devices being tested at each current level, and seeing how many trips each of the devices will survive. FIG. 2 is a three-dimensional plot of the current (x axis), the number of trips (y axis) and percentage of survivors (z axis).

FIG. 3 shows the test circuit which is used in obtaining results as shown in FIGS. 1 and 2, and in the test routines defined above. The test circuit comprises a DC voltage source 6, e.g. of 120 or 240 volts, a fixed resistor 7 whose resistance can be varied to produce the desired test conditions but which is fixed for any particular test routine, a switch 8 and the device 9.

FIG. 8 is an equivalent circuit for a telephone system (i.e. a circuit which omits components which, though needed for other purposes, do not play any significant part in the behavior of the circuit under a fault condition as discussed below). This is an example of an intrusion-prone circuit of the invention.

A telephone 10, shown generally by a box, includes a switch 11 shown in the open position, i.e. the telephone is not in use. The telephone is connected to an exchange by lines 12 and 13, whose resistance, depending on the distance of the telephone from the exchange, is for example 40 to 500 ohms. When the telephone is not in use, lines 12 and 13 are connected via relay contacts 14 and 15 to a resistor 16, which typically has a resistance of about 700 ohms, and a battery 17, which typically has a voltage of about 50 volts. PTC protective devices 18 and 19 are in series with relays 14 and 15 respectively. When the telephone is in use, relays 14 and 15 are open, and lines 14 and 15 are connected via relays 20 and 21 to the supervisory circuit of the telephone exchange, which includes two resistors 22 and 23 each typically having a resistance of about 200 ohms and a battery 24, which typically has a voltage of about 50 volts. PTC protective devices 25 and 26 are in series with relays 20 and 21 respectively. In this circuit, the fault condition which must be guarded against is the intrusion of an AC mains voltage, e.g. of 240 volts or more, for example as a result of a power line falling across one or both of lines 12 and 13 or the lines being connected to an AC power source. An AC mains voltage will generate currents which will damage the relays 14, 15, 20 and 21 or the resistors 16, 22 and 23, or wiring on circuit boards forming part of the circuit.

It will of course be realized that devices 18 and 19 could be omitted if protection of the supervisory circuit was all that was required, and that devices 25 and 26 could be omitted if protection of the line circuit was all that was required. Devices 18, 19, 25 and 26 could be replaced by a pair of protective devices placed in lines 12 and 13, so that a fault current would flow through them whether relays 14, 15 were closed and relays 20 and 21 were open, or vice versa.

FIG. 9 is an example of a fixed voltage circuit of the invention. An AC power source 30, having a voltage of at least 120 volts, eg 220 volts, is connected through circuit protection device 31 to a socket 32, to which is connected an electrical appliance 33 having a resistance $R_L$. Device 31 protects the circuit from excessive currents which are generated for example by shorting of the leads to the appliance 33 or, when the appliance is disconnected, by shorting of the terminals in the socket.

The invention is illustrated by the following Example.

EXAMPLE

The ingredients and amounts thereof given in the Table below were used in this Example.

TABLE

|  | MASTERBATCH | | | FINAL MIX | | |
| --- | --- | --- | --- | --- | --- | --- |
|  | g | wt % | vol % | g | wt % | vol % |
| Carbon Black (Furnex N765) | 1444 | 46.9 | 32.2 | 1143.9 | 33.8 | 26.9 |
| Polyethylene (Marlex 6003) | 1572 | 51.1 | 65.4 | 1246.3 | 36.8 | 54.7 |
| Filler (Hydral 705) | — | — | — | 948 | 28.0 | 16.5 |

TABLE-continued

| | MASTERBATCH | | | FINAL MIX | | |
|---|---|---|---|---|---|---|
| | g | wt % | vol % | g | wt % | vol % |
| Antioxidant | 62 | 2.0 | 2.3 | 48.8 | 1.4 | 1.9 |

NOTES:
Furnex N765 (available from City Services Co.) has a particle size (D) of 60 millimicrons, a density of 1.8 g/cc, and a surface area (s) of 32 m²/g.
Marlex 6003 is a high density polyethylene with a melt index of 0.3 which is available from Phillips Petroeum Co.
The antioxidant used was an oligomer of 4,4-thio bis (3-methyl-6-t-butyl phenol) with an average degree of polymerization of 3-4, as described in U.S. Pat. No. 3,986,981.
Hydral 705 is alumina trihydrate.

The ingredients for the master batch were dry blended and then mixed for 8 minutes in a Banbury mixer turning at high gear. The mixture was dumped, cooled and granulated. The final mix was prepared by dry blending 948 g. of the Hydral 705 with 2439 g. of the master batch mixture, and then mixing the dry blend for 4-5 minutes in a Banbury mixer turning at high gear. The mixture was dumped, cooled, granulated and dried (at 70° C., 1 Torr for 16 hours).

The granulated final mix was melt extruded as a strip 0.5 inch wide and 0.105 inch thick, using a cross-head die, around a pair of pre-heated 20 AWG 19/32 stranded nickel-plated copper wires whose centers were 0.239 inch apart. The extruded product was cut into 1 inch lengths, and the polymeric composition removed from half of each length to produce a device as shown in FIG. 4.

We claim:
1. An electrical circuit which comprises
   (1) a source of electrical power having a voltage of V volts;
   (2) a circuit protection device comprising at least two electrodes and a PTC element which has a switching temperature $T_s$ and which comprises a polymer component and, dispersed in said polymer component, a particulate filler component which comprises a conductive filler; and
   (3) a damageable circuit component which is damaged if the current flowing through it exceeds a value $i_{damage}$ amps for a time t seconds, where t is 30;

said electrical circuit having a normal operating condition in which said device is in a low temperature low resistance stable operating condition and
   (A) a current $i_n$ flows through said device;
   (B) said device is at a temperature $T_{dn}$ and has a resistance $R_{dn}$;
   (C) said device is in contact with a medium which is at a temperature $T_n$;
   (D) a current less than $i_{damage}$ flows through said damageable circuit component; and
   (E) there is a stable equilibrium between the rate at which the device generates heat by I²R heating and the rate at which heat is lost from the device;

said device having an electrical power/temperature relationship and being capable of losing heat at a rate such that if new electrical elements comprising a new power source and a switch are introduced into the circuit or a part of the circuit so that a test fault circuit is created in which, when said switch is closed, a test cycle is initiated and
   (a) there is an initial fault current flowing through said damageable circuit component which exceeds $i_{damage}$;
   (b) there is an initial fault current flowing through said device which results in a computed current density in the PTC element which reaches a maximum of 1000 amps/inch² when the test fault circuit is subjected to the first of the successive test cycles defined below;
   (c) said device and said damageable circuit component are in series; and
   (d) the sum of the initial potential drop over said device and the initial potential drop over said damageable circuit component is $V_{int}$, where $V_{int}$ is at least 120 volts and at least $1.5 \times V$;

then if the fault test circuit is subjected to N successive test cycles, where N is 5, in each of which test cycles the switch is closed for 5 seconds, the switch is then opened and the device is allowed to cool to $T_{dn}$ before the next test cycle is carried out, then in each of said test cycles, the result of closing the switch is that the device generates heat by I²R heating at a rate which exceeds the rate at which heat can be lost from the device, thus causing the resistance of the device to rise rapidly and the circuit current to fall, and thereafter the current through the damageable circuit component reaches a stable value which is less than $i_{damage}$, the potential drop over the device reaches a stable value which is the higher of 150 volts and $1.5 \times V$, and the device reaches a high temperature high resistance stable operating condition in which the rate at which the device generates heat by I²R heating is equal to the rate at which heat is lost from the device; and after said test cycles have been completed, the device has a resistance at $I_{dn}$ which is less than $3 \times R_{dn}$.

2. A circuit according to claim 1 wherein said source of electrical power is a DC source of voltage at most 75 volts and said new power source is an AC source.

3. A circuit according to claim 2 wherein said new power source is an AC source of voltage at least 220 volts and in each of the test cycles the potential drop over the device reaches a stable value substantially equal to the voltage of the new power source.

4. A circuit according to claim 1 which is a line circuit of a telephone system.

5. A circuit according to claim 4 wherein each leg of the circuit contains a said device.

6. A circuit according to claim 5 which is a supervisory circuit of a telephone system.

7. A circuit according to claim 1 wherein, in the circuit protection device, the PTC element provides the sole electrical connection means between the electrodes.

8. An electrical circuit which comprises
   (1) a source of electrical power having a voltage of V volts;
   (2) a circuit protection device comprising at least two electrodes and a PTC element which has a switching temperature $T_s$ and which comprises a polymer component and, dispersed in said polymer component, a particulate filler component which comprises a conductive filler; and
   (3) a damageable circuit component which is damaged if the current flowing through it exceeds a value $i_{damage}$ amps for a time t seconds, where t is 30;

said electrical circuit having a normal operating condition in which said device is in a low temperature low resistance stable operating condition and
   (A) a current $i_n$ flows through said device:
   (B) said device is at a temperature $T_{dn}$ and has a resistance $R_{dn}$;

(C) said device is in contact with a medium which is at a temperature $T_n$;

(D) a current less than $i_{damage}$ flows through said damageable circuit component; and (E) there is a stable equilibrium between the rate at which the device generates heat by $I^2R$ heating and the rate at which heat is lost from the device; said device having an electrical power/temperature relationship and being capable of losing heat at a rate such that if new electrical elements comprising a new power source and a switch are introduced into the circuit or a part of the circuit so that a fault test circuit is created in which, when said switch is closed, a test cycle is initiated and (a) there is an initial fault current flowing through said damageable circuit component which exceeds $i_{damage}$;

(b) there is an initial fault current flowing through said device which is the higher of 1 amp and $3 \times i_{crit}$ where $i_{crit}$ is the maximum current which, when it flows through the device in the circuit, causes the device to generate heat by $I^2R$ heating at a rate equal to the rate at which heat can be lost from the device;

(c) said device and said damageable circuit component are in series; and (d) the voltage is such that the peak potential drop over said device in the first of the test cycles defined below is 240 volts;

then if the fault test circuit is subjected to N successive test cycles, where N is 5, in each of which test cycles the switch is closed for 30 seconds, the switch is then opened and the device is allowed to cool to $T_{dn}$ before the next test cycle is carried out, then in each of said test cycles, the result of closing the switch is that the device generates heat by $I^2R$ heating at a rate which exceeds the rate at which heat can be lost from the device, thus causing the resistance of the device to rise rapidly and the circuit current to fall, and thereafter the current through the damageable circuit component reaches a stable value which is less than $i_{damage}$ and the device reaches a high temperature high resistance stable operating condition in which the rate at which the device generates heat by $I^2R$ heating is equal to the rate at which heat is lost from the device; and after said test cycles have been completed, the device has a resistance at $T_{dn}$ which is less than $3 \times R_{dn}$.

9. A circuit according to claim 8 wherein said source of electrical power is a DC source of voltage at most 75 volts and said new power source is an AC source.

10. A circuit according to claim 9 wherein said new power source is an AC source of voltage at least 220 volts and in each of the test cycles the potential drop over the device reaches a stable value substantially equal to the voltage of the new power source.

11. A circuit according to claim 8 which is a line circuit of a telephone system.

12. A circuit according to claim 11 wherein each leg of the circuit contains a said device.

13. A circuit according to claim 8 which is a supervisory circuit of a telephone system.

14. A circuit according to claim 13 wherein each leg of the circuit contains a said device.

15. An electrical circuit which comprises (1) a circuit protection device comprising at least two electrodes and a PTC element composed of a PTC composition which has a switching temperature $T_s$ and which comprises a polymer component and, dispersed in said polymer component, a particulate filler component which comprises a conductive filler;

(2) a source of electrical power having a voltage of $V_1$ volts which is at least 120 volts; and (3) other circuit elements which are connected in series with said PTC element and which have an impedance $R_L$ ohms;

said electrical circuit having a normal operating condition in which said device is in a low temperature low resistance stable operating condition and (A) a circuit $i_n$ flows through said device;

(B) said device is at a temperature $T_{dn}$ and has a resistance $R_{dn}$ which is less than $0.5 \times R_L$ ohm and less than $V_1$ ohms;

(C) said device is in contact with a medium which is at a temperature $T_n$; and (D) there is a stable equilibrium between the rate at which the device generates heat by $I^2R$ heating and the rate at which heat is lost from the device;

and said device having an electrical power/temperature relationship and being capable of losing heat to said medium at a rate such that (a) if elements of the circuit are changed so that the current flowing through said device increases slowly from $i_n$ while maintaining $T_n$ substantially constant, then the temperature of the device increases slowly until the circuit reaches a critical operating condition in which (i) the equilibrium between the rate at which the device generates heat by $I^2R$ heating and the rate at which heat is lost from the device is unstable, (ii) the device is at a temperature $T_{d\ trip}$ and has a resistance $R_{d\ trip}$, (iii) the rate at which the resistance of the devices changes with temperature ($dR_{d\ trip}/dT_{d\ trip}$), is positive, and (iv) the current has a value $i_{crit}$; and (b) if elements of the circuit are further changed so that the current flowing through the device increases to $2 \times i_{crit}$, while maintaining $T_n$ substantially constant, then the rate at which the device generates heat by $I^2R$ heating exceeds the rate at which heat can be lost from the device and thus causes the temperature and the resistance of the device to rise rapidly and the circuit current to fall, and thereafter the circuit reaches a high temperature high resistance stable operating condition in which (i) the rate at which the device generates heat by $I^2R$ heating is equal to the rate at which heat is lost from the device; and (ii) the device is at a temperature $T_{d\ latch}$ which is such that the ratio of the power in the circuit in the normal operating condition to the power in the circuit in the high temperature high resistance stable operating condition, the Switching Ratio, is at least 8;

and said device, after having been subjected to the test routine defined below, (i) having a resistance at $T_{dn}$ which is less than $3 \times R_{dn}$, less than $0.5 \times R_L$, and less than $V_1$ ohms; and (ii) having an electrical power/temperature relationship such that, when the device is replaced in said electrical circuit after having been subjected to said test routine, the electrical circuit (a) has a normal operating condition as defined, and (b) when the elements of the circuit are changed so as to increase the current in the circuit, the circuit first reaches a critical operating condition as defined and then reaches a high temperature high resistance stable operating condition as defined;

said test routine consisting of placing the device in a test circuit which consists essentially of the device, a switch, a fixed resistor of resistance of $R_1$ ohms and a source of electrical power having a voltage of $V_1$ volts, the device being in contact with said medium at said temperature $T_n$ and $R_1$ being such that the computed current density in the PTC element in the first of the test cycles defined below reaches a maximum of 1000 amp/inch$^2$, and subjecting the test circuit to N successive test cycles, where N is 5; in each of which test cycles the switch is closed for 5 seconds, whereby the device initially generates heat by $I^2R$ heating at a rate which exceeds the rate at which heat can be lost from the device, thus causing the resistance of the device to rise rapidly and the circuit current to fall, and thereafter the device reaches a high temperature high resistance stable operating condition in which the rate at which the device generates heat is equal to the rate at which heat is lost from the device; the switch is opened; and the device is allowed to cool to $T_n$ before the next test cycle is carried out.

16. A circuit according to claim 8 wherein, in the circuit protection device, the PTC element provides the sole electrical connection means between the electrodes.

17. A circuit according to claim 15 wherein $V_1$ is at least 150 volts AC.

18. A circuit according to claim 17 wherein $V_1$ is at least 240 volts AC.

19. A circuit according to claim 15 wherein, in the circuit protection device, the PTC element provides the sole electrical connection means between the electrodes.

20. An electrical circuit which comprises
   (1) a circuit protection device comprising at least two electrodes and a PTC element composed of a PTC composition which has a switching temperature $T_s$ and which comprises a polymer component and, dispersed in said polymer component, a particulate filler component which comprises a conductive filler;
   (2) a source of electrical power having a voltage $V_2$ volts which is at least 240 volts; and
   (3) other circuit elements which are connected in series with said PTC element and which have an impedance $R_L$ ohms;

said electrical circuit having a normal operating condition in which said device is in a low temperature low resistance stable operating condition and
   (A) a current $i_n$ flows through said device;
   (B) said device is at a temperature $T_{dn}$ and has a resistance $R_{dn}$ which is less than $0.5 \times R_L$ ohm and less than $V_2$ ohms;
   (C) said device is in contact with a medium which is at a temperature $T_n$; and
   (D) there is a stable equilibrium between the rate at which the device generates heat by $I^2R$ heating and the rate at which heat is lost from the device;

and said device having an electrical power/temperature relationship and being capable of losing heat to said medium at a rate such that (a) if elements of the circuit are changed so that the current flowing through said device increases slowly from $i_n$ while maintaining $T_n$ substantially constant, then the temperature of the device increases slowly until the circuit reaches a critical operating condition in which (i) the equilibrium between the rate at which the device generates heat by $I^2R$ heating and the rate at which heat is lost from the device is unstable, (ii) the device is at a temperature $T_{d\ trip}$ and has a resistance $R_{d\ trip}$, (iii) the rate at which the resistance of the devices changes with temperature ($dR_{d\ trip}/dT_{d\ trip}$), is positive, and (iv) the current has a value $i_{crit}$; and (b) if elements of the circuit are further changed so that the current flowing through the device increases to $2 \times i_{crit}$, while maintaining $T_n$ substantially constant, then the rate at which the device generates heat by $I^2R$ heating exceeds the rate at which heat can be lost from the device and thus causes the temperature and the resistance of the device to rise rapidly and the circuit current to fall, and thereafter the circuit reaches a high temperature high resistance stable operating condition in which (i) the rate at which the device generates heat by $I^2R$ heating is equal to the rate at which heat is lost from the device; and (ii) the device is at a temperature $T_{d\ latch}$ which is such that the ratio of the power in the circuit in the normal operating condition to the power in the circuit in the high temperature high resistance stable operating condition, the Switching Ratio, is at least 8;

and said device, after having been subjected to the test routine defined below,
   (1) having a resistance at $T_{dn}$ which is less than $3 \times R_{dn}$, less than $0.5 \times R_L$, and less than $V_2$ ohms; and
   (ii) having an electrical power/temperature relationship such that, when the device is replaced in said electrical circuit after having been subjected to said test routine, the electrical circuit
      (a) has a normal operating condition as defined, and
      (b) when the elements of the circuit are changed so as to increase the current in the circuit, the circuit first reaches a high resistance stable operating condition as defined;

said test routine consisting of placing the device in a test circuit which consists essentially of the device, a switch, a fixed resistor of resistance $R_2$ ohms and a source of electrical power having a voltage of $V_2$ volts, the device being in contact with said medium at said temperature $T_n$, and $R_2$ being such that in the first of the test cycles defined below the peak current through the device is the higher of 1 amp and $3 \times i_{crit}$, and subjecting the test circuit to N successive test cycles, where N is 5; in each of which test cycles the switch is closed for 30 seconds, whereby the device initially generates heat by $I^2R$ heating at a rate which exceeds the rate at which heat can be lost from the device, thus causing the resistance of the device to rise rapidly and the circuit current to fall, and thereafter the device reaches a high temperature high resistance stable operating condition in which the rate at which the device generates heat is equal to the rate at which heat is lost from the device; the switch is opened; and the device is allowed to cool to $T_n$ before the next test cycle is carried out.

21. A circuit according to claim 20 wherein $V_2$ is at least 150 volts AC.

22. A circuit according to claim 21 wherein $V_2$ is at least 240 volts AC.

23. A circuit according to claim 2 wherein, in the circuit protection device, the PTC element provides the sole electrical connection means between the electrodes.

* * * * *